United States Patent Office  2,785,138
Patented Mar. 12, 1957

2,785,138

PREPARATION AND REGENERATION OF SUPPORTED NOBLE METAL CATALYSTS

Thomas H. Milliken, Jr., Moylan, Pa., assignor to Houdry Process Corporation, Wilmington, Del., a corporation of Delaware No Drawing. Application December 1, 1952,
Serial No. 323,499

10 Claims. (Cl. 252—415)

The present invention relates to the preparation and/or regeneration of supported noble metal catalysts of the platinum family and particularly of such catalysts comprising a small amount of platinum supported on an absorptive carrier.

Catalysts comprising platinum in the amount of up to about 2% and generally not more than 1% by weight of a support such as alumina find use in hydrogenative reforming of hydrocarbon oils particularly for the upgrading of gasoline and naphtha and for the preparation of desired aromatic compounds by reactions which may include principally dehydrogenation and dehydroisomerization of naphthenes, isomerization and cyclization of acyclic compounds. Other side reactions take place to greater or less extent, depending upon the individual characteristics and activity or selectivity of the particular catalyst from this class and the severity of reaction conditions. It has also been suggested that certain of the catalysts of this type can be utilized to obtain hydrocracking of hydrocarbon oils.

In these hydrocarbon conversion processes, particularly where the extent of hydrocracking is kept relatively low, accompanying deposition of coke in the catalyst and/or loss of activity due to other factors, take place at comparatively slow rates, so that the catalyst can be employed over extensive non-interrupted on-stream periods of from several months up to a year or more. Eventually, however, whether after a long on-stream period or under some conditions after a shorter period of on-stream operation, the activity and/or selectivity of the catalyst is reduced to a sufficiently low level that further continued use is not feasible or becomes economically undesirable. Certain of these catalysts can be regenerated or reactivated to greater or less extent, but even as to these the known methods hitherto employed in regeneration of other catalysts, for instance siliceous cracking catalysts, are not applicable and special operations must be resorted to. In many instances even when the methods of regeneration attempted result in initial restoration of catalyst activity to a level approaching or reaching its original activity, when the catalyst is then returned to on-stream use in hydrocarbon conversion its activity falls off much more rapidly than that of fresh catalyst. This unusual behavior of the described supported platinum type catalyst, if previously observed, has not hitherto been reported; and the mechanism involved in loss of catalyst activity during initial use or after attempted regeneration has not been heretofore fully understood or appreciated.

Supported platinum and other noble metal catalysts have been prepared by the well known method of impregnating a supporting carrier, which may be porous alumina, with an aqueous solution of a soluble compound of the metal, of which chloroplatinic acid has been most extensively employed. The thus impregnated carrier is then heated and generally subjected to reduction in hydrogen. Improved catalysts are obtained by using as the support activated alumina which has been treated with acid, such as acetic acid, prior to impregnation with the platinum compound. Other methods of producing supported noble metal catalysts have also been described.

In most, if not all, of these and other known methods, the catalyst containing platinum in one form or another in the supporting carrier, is ultimately subjected to reduction in a hydrogen or other reducing gas stream. In similar manner, spent catalyst that is subjected to oxidative regeneration or other activation treatment is generally reduced with hydrogen before contacting with hydrocarbons when returned on stream, or in any event it is subjected to an atmosphere comprising high concentrations of hydrogen present in the hydrocarbon reaction zone.

During the course of extensive investigation of the structure and properties of supported platinum catalysts the unexpected discovery was made that by the incorporation of halogen in the hydrogen gas used in reduction of the catalyst, the resulting catalyst obtained exhibits exceptionally improved stability from the standpoint that it now loses activity or selectivity at a considerably lower rate when employed in hydrocarbon conversion than catalysts so reduced in the absence of halogen. If the amount of halogen thus incorporated during the reduction stage is carefully controlled, as will hereinafter appear, such halogen does not impart to the catalyst an excess initial cracking activity with accompanying initial rapid decline in activity otherwise observed in those catalysts prepared or treated to incorporate quantities of halogen in excess of certain "equilibrium" values further described below.

While numerous investigators, as appears from the extensive literature on the subject, have studied and attempted to explain differences in activity or behavior of supported platinum and other supported noble metal catalysts on the basis of the particle size of the platinum or like metal or its extent and/or manner of distribution in the support, none of these has evidenced any recognition of the effect of the halogen necessarily present after initial impregnation of the support with chloroplatinic acid, nor has any sound explanation been given of the ultimate disposition of the original halogen of the chloroplatinic acid during subsequent processing or use of such catalyst.

It has also been proposed to prepare catalysts by incorporation of halogen, preferably fluoride ions, in freshly precipitated alumina followed by treatment of the thus halogenated alumina with the reaction product obtained by passing hydrogen sulfide into aqueous chloroplatinic acid. In these catalysts halogen is stated to be present in the catalyst in some combined form, but the chemical structure of the catalyst with respect to the position occupied by the halogen particularly after reduction with hydrogen is not indicated nor attempted to be explained, and the alleged initial higher activity of these catalysts is apparently attributed to the catalytic function of the halide therein as such. It is also known from early times that halogen as such or in the form of hydrogen halide or as aluminum halide has catalytic activity in promoting cracking of hydrocarbons.

It had previously been recognized, as disclosed in prior application Serial No. 301,796, that a certain amount of halogen will be retained in equilibrium with alumina (as a stable complex), which amount is a function of the surface area of the alumina, and that loss of the thus bound halogen can be effected only by temporary or permanent dissociation of the halide complex by chemical reaction at the halide site, such as by displacement of halogen by other ions or groups. Thus, it appears, that halogen may become incorporated in alumina in different ways: up to a certain quantity, related to the surface area of the alumina, designated as the equilibrium level, the addition of halogen—irrespective of the manner by which it is added—effects isomorphous substitution of the halogen for hydroxyl groups necessarily present in the alumina and such isomorphously substituted halogen is firmly retained by the alumina. This amount of halogen will be taken up irrespective of halogen partial pressure in the gas or the concentration thereof in nonaqueous fluid employed for the impregnation. Beyond the equilibrium level the alumina may take on further quantities of halogen in an amount now dependent upon the concentration or partial pressure of halogen in the impregnating fluid. This additional halogen is held comparatively loosely by the alumina and will be given up to a gas stream or to non-aqueous solvent liquid up to the point that the equilibrium halogen level is again reached. The isomorphously bound halogen, on the other hand, can be removed from the alumina only by chemical reaction or ionic replacement (with OH ion for instance); or by lowering the surface area of the alumina. This difference between the isomorphously bound halogen taken up by the alumina and that amount which may be loosely incorporated in excess thereof can be demonstrated in the following manner. If a porous alumina is treated in a stream comprising hydrogen chloride vapor, up to a certain point it takes on about twice as much halogen as is represented by the weight change of the product and beyond that point further addition of halogen in excess of that quantity is accompanied by a gain in weight of the halogenated alumina in an amount directly corresponding to the weight quantity of the excess halogen. This observation is consistent with the explanation that in the initial treatment of the alumina each halogen replaces a hydroxyl group in the lattice—in the case of chloride ion (atomic weight=35.46) replacing hydroxyl (OH=17) the gain in weight is thus approximately half that of the incorporated chloride. If alumina is treated with chloroplatinic acid solution and the $PtCl_6$ ion is decomposed by reduction or otherwise, the released halogen is likewise capable of becoming chemically bound in the platinized alumina up to the amount of the equilibrium level of the area of the alumina penetrated by the chloroplatinic acid.

The activity of supported platinum catalysts is related within limits to the extent of the platinum surface thus provided. If the platinized catalyst is placed in an environment inducing or permitting migration of the platinum particles to form larger aggregates, the surface area of the platinum becomes diminished with consequent depreciation of catalyst activity. When alumina is impregnated with chloroplatinic acid, the platinum is fixed in the support apparently as a complex ion, but if that complex ion is decomposed the platinum would become free to agglomerate. If the halogen ions, however, are retained at the platinum sites or near the platinum sites these tend to fix the platinum against migration and agglomeration and thus stabilize the catalyst. From the foregoing it will be seen that stabilization of platinum in an alumina support is obtained by the presence in associated state in the vicinity of the platinum in the platinized support of an amount of halogen ion satisfying the required equilibrium and the same is true in the case of other noble metals of the platinum series such as palladium and of halides other than chloride. This tendency of the platinum to form larger aggregates, in the absence of fixing or stabilizing groups at or near the platinum sites in the alumina, is evidenced by a progressive decline in catalytic activity. Thus the catalyst, even when deficient or free of stabilizing components such as halide, may display an initially high catalytic activity but gradually—or more rapidly with increased temperature—the activity declines evidently due to loss of platinum surface area. This explanation is confirmed by the fact that when the initial catalyst of high activity is examined by X-ray diffraction the pattern fails to show any significant lines corresponding to platinum, but when such catalyst is kept in a heated atmosphere for about a week or somewhat longer, the X-ray diffraction pattern begins to show definite platinum lines indicating platinum agglomeration, at which time the catalyst also has been reduced in activity.

As has been set out above, the equilibrium halogen capacity of alumina is quantitatively dependent upon the surface area of the alumina. Thus, it has been found that for an activated alumina of commerce having a surface area of 50 square meters per gram, equilibrium is attained at about 0.4 to about 0.5 weight percent chloride ion; halogen in excess of this amount is driven off comparatively readily. In the case of halogen ions other than chlorine, it would appear that the lower bond energies of bromine and iodine may tend to lower the extent of isomorphous substitution, while the higher bond energies of fluorine may easily give rise to oxy fluoride structures. Nevertheless, in practice the quantity of such other halide that may be employed in place of the chloride is that corresponding approximately to the atomic equivalent for the given equilibrium chloride values related to the surface area of the alumina. With such alumina supports containing the usual small amounts of platinum, as up to about 1% by weight and perhaps even up to about 2% by weight of the catalyst, the presence of this equilibrium quantity of halogen is effective in stabilizing platinum; excess halogen, on the other hand, results in increased cracking activity with consequent coke production which, in itself and/or as a result of other concomitant reaction mechanism, tends to produce an initial rapid deactivation of the catalyst. In general, it can be stated, that comparatively stable platinum catalysts are had when there is present therein about 0.1 weight percent chloride ion (or a corresponding atomic quantity of other halide ion) for each ten square meters of alumina surface. When the amount of halide exceeds about 0.1 weight percent, for each 10 sq. m./g. $Al_2O_3$, the added cracking function more than overcomes the stabilizing effect of the halogen.

A catalyst prepared by impregnation of activated alumina with chloroplatinic acid should inherently be stable if it contains sufficient halide to satisfy the described equilibrium level for that cross-sectional portion of the catalyst impregnated by the platinum. When the impregnated alumina, however, is subjected to an environment in which the halogen is removed from the catalyst, as will occur in the presence of water vapor at elevated temperatures, the stabilizing influence of the halogen is lost so that the platinum unless otherwise stabilized is now free to form larger aggregates with loss of surface and corresponding decline in catalytic activity. By the presence of halogen in the treating gas stream, as advocated by the present invention, the loss of halogen is thus prevented or the halogen that may have been lost is replaced, thereby retaining the activity and stability of the catalyst. While it is true that the isomorphously bound halogen of the catalyst, on the basis of the above discussion, should not be driven off by a dry gas such as hydrogen, there is nevertheless present or formed in practical operation a small amount but sufficient water, to react at the halogen sites and replace such halogen by hydroxyl. Thus, the hydrogen stream itself may not be bone dry; a certain amount of free pick up moisture may be present in the catalyst, and water may also be formed by reaction of hydrogen with oxygen or hydroxyl groups present in the catalyst. For instance, if the catalyst had been dried or calcined in air or under conditions permitting oxidation, the platinum may be stabilized as $PtO_2$; on reduction treatment with hydrogen, water will be released and may then react to remove chemically bound or isomorphous halogen from the catalyst.

While in the above discussion particular reference is made to the better known catalysts comprising platinum or palladium supported on alumina, the same considerations apply with such catalysts comprising other group VIII noble metals on alumina, as well as to catalysts comprising as supports other metal oxides behaving more or less like alumina, particularly the oxides of magnesium, zirconium, titanium and beryllium. There is no clear indication that the presence of halogen will effect or improve stabilization of platinum supported on activated carbon or on siliceous materials such as silica gell, silica-alumina and natural siliceous clays and earths.

In the treatment or platinized alumina catalyst with a halogen-containing gas stream, such as with a reducing hydrogen stream in accordance with the invention, the treatment is operated for sufficient time and employing adequate halogen concentration in the gas stream to assure the ultimate presence in the catalyst of an amount of halogen substantially equal to and not greatly in excess of that required to satisfy the halogen equilibrium level of the particular alumina. This may be accomplished by using a gas stream of fairly low halogen concentration, for instance one containing a halogen concentration corresponding to 0.01 to 0.1 volume percent hydrogen chloride or a corresponding atomic quantity of other halide gas or vapor, and operating for a period predetermined by sample test to provide the required halogen content in the catalyst. This type of operation, however, presents complex control difficulties in practice. The better practice is to extend the treatment over a time such that the quantity of halogen incorporated in the catalyst is in excess of the equilibrium level and to follow that treatment with a gas stream free of (or deficient in) halogen. By the latter treatment the excess halogen will be removed at first at a comparatively rapid rate but as the equilibrium halogen level is approached the halogen will be given up by the catalyst at a considerably slower rate so that overtreatment with the halogen-free gas is not apt to occur and the presence of a substantial excess of halogen in the catalyst is likewise avoided. In carrying out the described treatment, initially to incorporate excess halogen in the catalyst, the total treating period can be kept at a minimum by starting with a gas having a comparatively high halide concentration, say in excess of .5–1% by volume of the treating gas, at which high concentrations an amount of halogen in excess of the required equilibrium can be incorporated in the catalyst in a relatively short time, in the order of minutes, following which, treatment with the halogen-free gas may be continued for a period of from about 2 hours to over 10 hours without danger of impairing catalyst stability.

The use of halogen in the hydrogen stream employed for reduction of the catalyst applies in the case of catalysts already containing an amount of halogen equal to or in excess of the required equilibrium value, to prevent falling materially below that level as a result of the reduction, as well as in the case of catalysts containing less than the required equilibrium level. Catalysts prepared by impregnation of alumina with chloroplatinic acid, for instance, may already contain that quantity of halogen sufficient to stabilize the platinum; by subjecting such catalysts to reduction in the presence of halogen, the retention of this halogen content is assured. Catalysts so prepared and having less than the equilibrium halogen requirement are brought to the required level during the described reduction.

The treatment with halogen-containing reducing gas applies in the case of freshly prepared catalysts as well as to catalysts that have been subjected to oxidative regeneration or other methods of reactivation.

The following example describes a preferred method for manufacture of fresh catalyst.

*Example I*

Commercial activated alumina in the form of calcined cylindrical pellets (Harshaw) and having a surface area of about 80 square meters per gram were leached with 10% acetic acid solution for one hour and then with fresh acid for an additional hour, followed by water washing. The washed pellets were dried at 200° F. then calcined in air for 2 hours at 1050° F. The calcined pellets then were dipped in aqueous chloroplatinic acid solution for one hour, using an amount of $H_2PtCl_6$ furnishing about 0.5 gram of Pt per 100 grams of the pellets; then dried for two hours at 250° F.

The thus impregnated pellets were then charged to a fixed bed reactor and the reactor and catalyst purged with nitrogen containing approximately .053 volume percent HCl (HCl partial pressure=0.4 mm. Hg) while the temperature of the reactor was brought up to 650° F., and the purge gas run for an additional six hours bringing the temperature up to 900° F. The catalyst was then reduced at this temperature by treatment for two hours with a hydrogen gas stream containing approximately 0.053 volume percent HCl, after which the reactor was brought up to 700 p. s. i. g. by running in hydrogen alone for one hour.

The reactor was then charged with an East Texas naphtha fraction (boiling over the range of 220–390° F.) together with 0.002 weight percent HCl (added as tertiary-butyl chloride), operating at 925° F. at 500 p. s. i. g., a space rate of 3 volumes naphtha per hour per volume of catalyst and with the recycling of 6 volumes of hydrogen gas per volume of fresh naphtha charge. By continuous operation for a period of over 10 days the obtained reformate continued at an unleaded octane level above 90 (original charge ON=40).

*Example II*

A somewhat modified start-up procedure from that given in the previous example omits the use of halogen with the purge gas, the halogen being added with the reducing gas in higher concentration or over a longer period to reach or exceed somewhat the equilibrium halogen level. Thus, using the same $H_2PtCl_6$ impregnated alumina as in the preceding example charged to the hydrocarbon conversion reactor, the vessel and contents are brought up to about 800° F. with nitrogen (other inert gas or air may be used), following which hydrogen containing 0.5 mol percent HCl is run in at substantially atmospheric pressure until reduction of the catalyst is complete as determined by the substantial absence of water vapor in the off gas, after which time hydrogen is continued alone for one-half hour to purge the catalyst of at least part of the excess halide and subsequently the reactor is brought to operating pressure with hydrogen while continuously purging. When at the required pressure the naphtha charge is run in starting at a low temperature (800–850° F.) during the initial operating period of the first 12 hours and the temperature thereafter being raised to the required run temperature. By operating at the low initial conversion temperature, possible harm to the catalyst by an excess of halide is avoided or minimized.

The application of the invention to the treatment of regenerated catalyst will be seen from the following example.

*Example III*

Catalyst containing about 0.5% Pt on alumina, prepared by impregnation of acetic acid-leached activated alumina with chloroplatinic acid followed by reduction in a hydrogen stream, was employed in conversion of naphtha over a long operating period. During the conversion tertiarybutyl-chloride, in an amount furnishing 0.002% HCl by weight, was added with the naphtha charge. At the end of the operating period the reactor was brought to atmospheric pressure and the catalyst was purged in situ with purified nitrogen (oxygen-free) for three hours then subjected to regeneration in a nitrogen gas stream containing about 0.25 volume percent $O_2$ for a period of 24 hours at substantially atmospheric pressure and at a maximum attained temperature of about 915° F. Following regeneration the catalyst was reduced in a hydrogen gas stream containing approximately 0.053 volume percent HCl for 12 hours, followed by an additional two-hour treatment with hydrogen alone for approximately two hours, after which time the reactor was brought to operating pressure (600 p. s. i. g.) by continuing hydrogen feed, at which time the naphtha feed was restored. Following the regeneration the octane rating of the reformate was equal to that attained with fresh catalyst.

The catalyst following regeneration and reduction in a halogen containing gas stream as above described will contain at least and not much more than the required equilibrium content of halogen. Thus, it was found that used catalyst comprising 0.5% Pt on activated alumina, which had been regenerated over a 24-hour period at 900° F. with diluted oxygen in the concentration set out in the above example, and then treated for 12 hours in a hydrogen gas stream containing 0.053 volume percent HCl (partial pressure=0.4 mm. Hg), at the end of this treatment had a chloride content of approximately 0.1% for each 10 sq. m. of alumina surface.

Obviously many modifications and variations of the invention as hereinbefore set forth may be made without departing from the spirit and scope thereof and therefore only such limitations should be imposed as are indicated in the appended claims.

What is claimed is:

1. The process of stabilizing supported noble metal catalyst of the platinum family against rapid deactivation in use, which comprises treating such catalyst in a stream of reducing gas prior to such use, said reducing gas being composed essentially of hydrogen containing therein up to 1% by volume of chloride vapor expressed as hydrogen chloride.

2. In the preparation of catalyst comprising up to 2% by weight platinum distributed on adsorptive alumina involving impregnation of the alumina with chloroplatinic acid solution and drying of the impregnated alumina, the improvement which comprises reducing the dried product in a gas stream consisting essentially of hydrogen containing therein about 0.01 to 0.1% hydrogen chloride.

3. The improvement defined in claim 2 wherein said reduction with the chloride-containing hydrogen stream is followed by further treatment with a hydrogen stream of lower to no halogen content, and the several treatments with the hydrogen-containing gas streams are carried out for a time and under conditions resulting in the production of catalyst containing at least approximately an equilibrium quantity of combined chloride as determined by the surface area of the alumina, and not materially in excess of such equilibrium quantity.

4. The improvement defined in claim 3 wherein said reduction with the chloride-containing hydrogen stream is carried out for a time and under conditions effecting incorporation of an amount of combined chloride resulting in catalyst having a chloride content in excess of said equilibrium and the following treatment is effected with a halogen-free hydrogen stream over a period to lower the chloride content of the catalyst to approximately said equilibrium value.

5. In the regeneration of used catalyst comprising up to 2% by weight of noble metal of the platinum family distributed in adsorptive alumina, wherein the used catalyst is treated in a gaseous oxidizing medium to effect combustion of carbonaceous deposit thereon, the step on subjecting the catalyst after such combustion to a period of reduction in a gaseous reducing stream, during a portion at least of which reduction period the catalyst is contacted with gas consisting essentially of hydrogen containing chloride vapor, and during which reduction period the final halide content of the catalyst is adjusted to comprise chloride as total halide in an amount corresponding to approximately 0.1 percent by weight of the support for each 10 square meters of surface of such support.

6. The method as defined in claim 5 wherein during such reduction period the final halide content of the catalyst is adjusted to comprise chloride as total halide in an amount corresponding to approximately 0.1 percent by weight of the support for each 10 square meters of surface of such support.

7. The method of stabilizing platinum on alumina catalyst against agglomeration of the platinum therein which comprises treating such catalyst with a stream of hydrogen gas containing a minor quantity of hydrochloride vapor under conditions to incorporate therein an amount of chloride ion equal approximately to 0.1 percent by weight of the support for each 10 square meters of surface of said support.

8. In the preparation or activation of catalyst comprising up to about 1% by weight of platinum distributed in activated alumina, the improvement which comprises fixing a halide content in such catalyst to comprise about 0.4 to 0.5 percent by weight of combined chloride per 50 square meters of catalyst surface, such fixing including the step of treating the catalyst in a reducing gas stream comprising predominantly hydrogen and containing at least 0.01 percent to 1.0 percent by volume hydrogen chloride.

9. The method as defined in claim 8 wherein said reducing gas stream contains in excess of 0.5% by volume hydrogen chloride and treating with such reducing gas stream is carried out over a period of time sufficient to incorporate at least the eqlilibrium level of halogen in the catalyst, following which the catalyst is treated with non-oxidizing halogen-free gas to adjust the halide content to the defined range.

10. The method which comprises impregnating adsorptive alumina with chloroplatinic acid in an amount furnishing up to 1% Pt by weight of the alumina, drying the thus impregnated alumina, and thereafter reducing the dried product in a stream of hydrogen gas containing 0.01 to 1.0% by volume of HCl vapor.

References Cited in the file of this patent
UNITED STATES PATENTS

| | | |
|---|---|---|
| 2,293,891 | Evering | Aug. 25, 1942 |
| 2,461,959 | Brandon | Feb. 15, 1949 |
| 2,475,155 | Rosenblatt | July 5, 1949 |
| 2,479,110 | Haensel | Aug. 16, 1949 |
| 2,582,428 | Haensel | Jan. 15, 1952 |
| 2,606,878 | Haensel | Aug. 12, 1952 |
| 2,642,384 | Cox | June 16, 1953 |